United States Patent
Brodsky et al.

(10) Patent No.: US 6,237,142 B1
(45) Date of Patent: May 22, 2001

(54) METHOD FOR SYNCHRONIZATION BETWEEN LINKS AND GROUP DEFINITIONS WITHIN AN OBJECT-ORIENTED SYSTEM

(75) Inventors: Stephen Andrew Brodsky, Los Gatos; Dipayan James Gangopadhyay, Cupertino; Timothy James Grose, Sunnyvale; Rebecca Mei-Har Lau; Subrata Mitra, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/850,829

(22) Filed: May 2, 1997

Related U.S. Application Data

(63) Continuation-in-part of application No. 08/747,415, filed on Nov. 12, 1996, now Pat. No. 5,893,913, and a continuation-in-part of application No. 08/747,414, filed on Nov. 12, 1996, now Pat. No. 6,011,559, and a continuation-in-part of application No. 08/747,416, filed on Nov. 12, 1996, now Pat. No. 5,917,498, and a continuation-in-part of application No. 08/747,057, filed on Nov. 12, 1996, now Pat. No. 5,907,706, and a continuation-in-part of application No. 08/747,058, filed on Nov. 12, 1996, now Pat. No. 5,983,016, and a continuation-in-part of application No. 08/747,417, filed on Nov. 12, 1996, now Pat. No. 5,991,536.

(51) Int. Cl.⁷ .................................................. G06F 9/45
(52) U.S. Cl. ............................................................. 717/10
(58) Field of Search .................................... 395/710, 683; 709/303; 717/10

(56) References Cited

U.S. PATENT DOCUMENTS 5,303,379 * 4/1994 Khoyi et al. .......................... 395/710
5,581,760 * 12/1996 Atkinson et al. ..................... 395/710

OTHER PUBLICATIONS

Adjeroh et al., Synchronization Mechanism for Distributed Multimedia Presentation Systems, IEEE, pp. 30–37, 1995.*
Sharifi et al., A Multiple Access Technique for Centralized Multiple Satellite Networking with on–board Processing in the Central Node, IEEE, pp. 145–149, 1988.*
Kimura, T., Object–Oriented Dataflow, IEEE, pp. 180–186, 1995.*

* cited by examiner

Primary Examiner—Kakali Chaki
Assistant Examiner—John Q. Chavis
(74) Attorney, Agent, or Firm—Gates & Cooper

(57) ABSTRACT

A method, apparatus, and article of manufacture which provides for synchronizing links and group definitions in an object-oriented system. The method comprises the steps of creating a first class and a second class within a memory of a computer, creating a link between the first class and the second class within the memory of the computer, setting a multiplicity value within the memory of the computer to define a first group within the first class and a second group within the second class, creating an instance of the first class in the memory of the computer where the instance is within the first group, changing the group definition in the memory of the computer to include the instance and link the first group to the second group via the created link, and changing the created link in the memory of the computer to reflect the changes in the defined first group.

36 Claims, 13 Drawing Sheets

METHOD FOR SYNCHRONIZATION BETWEEN LINKS AND GROUP DEFINITIONS WITHIN AN OBJECT-ORIENTED SYSTEM

CROSS-REFERENCE TO RELATED APPLICATIONS

This application is a continuation-in-part of the following and commonly-assigned patent applications:

Application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky et al., now U.S. Pat. No. 5,893,913;

Application Ser. No. 08/747,414, entitled "LAYOUT METHOD FOR ARC-DOMINATED LABELLED GRAPHS," filed on Nov. 12, 1996, by Dipayan Gangopadhyay et al., now U.S. Pat. No. 6,011,559;

Application Ser. No. 08/747,416, entitled "MULTI-OBJECT VIEWS IN AN OBJECT MODELING TOOL," filed on Nov. 12, 1996, by Roni Korenshtein, now U.S. Pat. No. 5,917,498,;

Application Ser. No. 08/747,057, entitled "INTERACTIVE MODELING AGENT FOR AN OBJECT-ORIENTED SYSTEM," filed on Nov. 12, 1996, now U.S. Pat. No. 5,907,706, by Stephen A. Brodsky et al.,;

Application Ser. No. 08/747,058, entitled "EXECUTION ENGINE IN AN OBJECT MODELING TOOL," filed on Nov. 12, 1996, by Stephen A. Brodsky et al., now U.S. Pat. No. 5,983,016,;

Application Ser. No. 08/747,417, entitled "NOTIFICATION MANAGER FOR OBJECT-ORIENTED SYSTEMS," filed on Nov. 12, 1996, by Stephen A. Brodsky et al., now U.S. Pat. No. 5,991,536,; all of which applications are incorporated by reference herein.

This application is also related to the following co-pending and commonly-assigned patent applications:

Application Ser. No. 08/850,858, entitled "OBJECT OUTLINE VIEW FOR GROUPS WITHIN AN OBJECT-ORIENTED SYSTEM," filed on same date herewith, by Stephen A. Brodsky et al.,;

Application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on same date herewith, by Stephen A. Brodsky et al.,;

Application Ser. No. 08/850,832, entitled "CHANGE AND ACCOUNTING LOG FOR OBJECT-ORIENTED SYSTEMS," filed on same date herewith, by Stephen A. Brodsky et al.,;

Application Ser. No. 08/850,838, entitled "MODEL TRACE VIEW FOR OBJECT-ORIENTED SYSTEMS," filed on same date herewith, by Stephen A. Brodsky et al., now U.S. Pat. No. 5,960,199,;

Application Ser. No. 08/850,337, entitled "FRACTAL NESTED LAYOUT FOR HIERARCHICAL SYSTEMS," filed on same date herewith, by Stephen A. Brodsky,;

Application Ser. No. 08/850,847, entitled "REFERENCE ATTRIBUTES WITHIN AN OBJECT-ORIENTED SYSTEM," filed on same date herewith, by Stephen A. Brodsky et al.,;

all of which applications are incorporated by reference herein.

BACKGROUND OF THE INVENTION

1. Field of the Invention

This invention relates generally to object-oriented environments, and in particular to a method for synchronizing links and group definitions across an object-oriented system.

2. Description of Related Art

In object-oriented systems, there is often a need to modify classes, objects, attributes and object properties across an object-oriented system. Current methods for modifying definitions or creating objects and classes are not structured and are often complex. Such complex methods often result in numerous errors and inefficiencies throughout the object-oriented system, and are overly inflexible. Current tools allow users to draw links between classes, but do not provide a representation for the link in one-to-many links or many-to-many links in instances of the classes. What is needed, then, is a straightforward, efficient method for synchronizing definitions across an object-oriented system. There is also a need to express relationships between instances of classes in an object-oriented system. There is also a need for a representation of one-to-many links or many-to-many links in instances of classes. There is a further need in the art for a method that allows for a dynamic modification of classes and properties depending on the type of class or property involved.

SUMMARY OF THE INVENTION

To overcome the limitations in the prior art described above, and to overcome other limitations that will become apparent upon reading and understanding the present specification, the present invention discloses a method, apparatus, and article of manufacture for synchronizing links and group definitions in an object-oriented system. The method comprises the steps of creating a first class and a second class within a memory of a computer, creating a link between the first class and the second class within the memory of the computer, setting a multiplicity value within the memory of the computer to define a first group within the first class and a second group within the second class, creating an instance of the first class in the memory of the computer where the instance is within the first group, changing the group definition in the memory of the computer to include the instance and link the first group to the second group via the created link, and changing the created link in the memory of the computer to reflect the changes in the defined first group.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
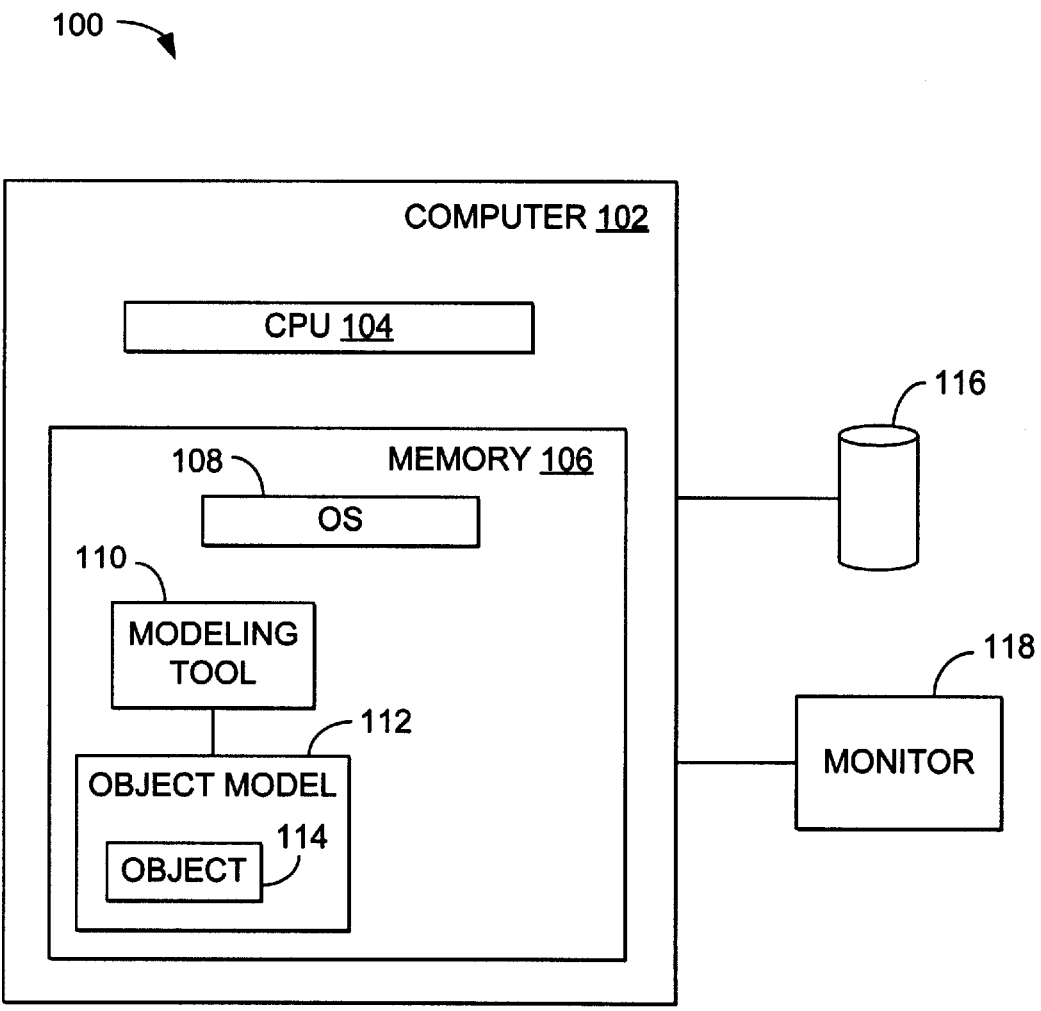
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes an object-oriented modeling tool 110, an object model 112, and various objects 114.

In the preferred embodiment, the operating system 108, the object modeling tool 110, the object model 112, and the objects 114 are all tangibly embodied in a computer-readable medium, e.g., data storage device 116, which could include one or more fixed or removable data storage devices, such as a removable cartridge drive, floppy disc drive, hard drive, CD-ROM drive, tape drive, etc. The computer 102 displays characters, text, and graphics on a monitor 118 which allows a user to view what operations the computer 102 is performing using modeling tool 110. Further, the operating system 108, the object modeling tool 110, the object model 112, and the objects 114 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Synchronizing the Object-Oriented System

Figure 2:
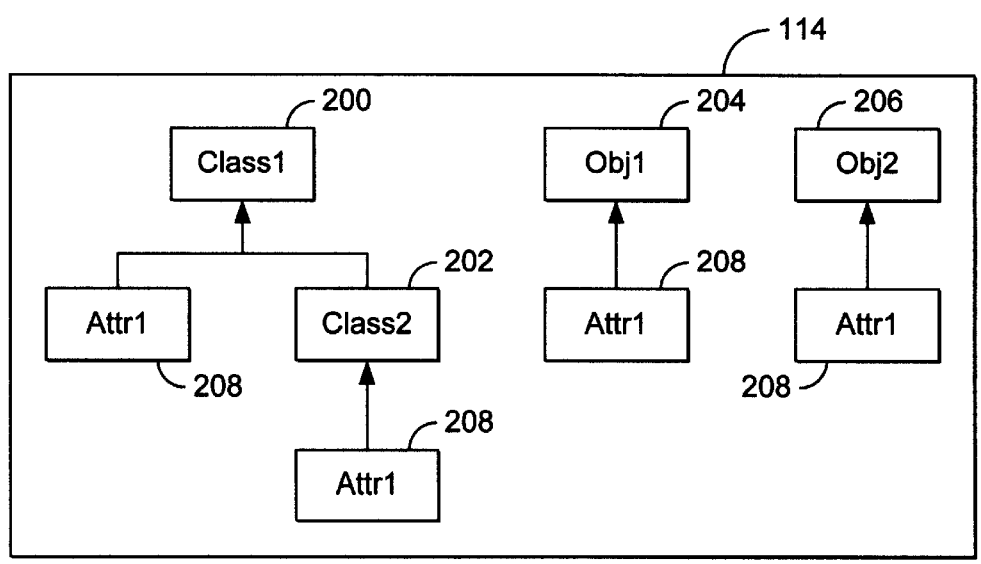
FIG. 2 is a block diagram illustrating the structure of an exemplary object-oriented system according to the present invention.

FIG. 2 is a block diagram illustrating the structure of an exemplary object-oriented system 114 according to the present invention. In the object-oriented system 114, Class2 202 is a subclass of Class1 200. Object1 (Obj1) 204 is an instance of Class1 200 and Object2 (Obj2) 206 is an instance of Class2 202.

Class1 200 and Class2 202 both include Attribute1 (Attr1) 208. Attribute1 208 is propagated to Object1 204, which is an instance of Class1 200. Attribute1 208 is also propagated to Object2 206, which is an instance of Class2 202. The attributes are identified as Class1/Attribute1, Class2/Attribute1, Object1/Attribute1, and Object2/Attribute1.

However, Class1 200 and Class2 202 can be related via a link, which can change depending on the relationship of Object1 204 and Object2 206. As the relationship between Object1 204 and Object2 206 changes, the parameters of the link must also change to synchronize the model of the system 114.

The link can be of two different types, depending on whether the link corresponds to a group of objects contained within another object, or whether the link corresponds to a group of references to objects that exist outside of the group.

An object can be a member of multiple groups, and a group can have more than one object within the group. Thus, a link must define and support a variable that refers to multiple instances. This variable is called multiplicity. To define a group, the multiplicity variable of a link is defined to be unlimited, and designated by the character "*" (asterisk). The group construct must also provide support for adding and deleting members of a group, and moving members from one group to another.

Group Properties

The group construct must provide properties to identify the group, type of group, and limitations on objects that can be members of the group as well as limitations on access to the group. These properties of the group construct are the group names, descriptions, types, member types, and visibility.

Group names are in the same name scope as other things which belong to objects and classes, like attributes. The group descriptions are words or phrases that give a lengthier definition of the group.

There are two types of groups: association groups and containment groups. Association groups contain reference members corresponding to objects that exist outside the group. Containment groups contain object members that exist within the group.

An object member is physically within the group; if the group is deleted, the object is deleted also. A reference member contains a reference to an object that exists outside the group. If the group is deleted, the object remains.

The member type allows users to restrict which objects and references can be added to a group. It is the name of a class. Only instances of that class or its subclasses can be added to the group. This limitation applies to both reference members and object members.

If a member of a group is an object, the path name of the object is the path name of the group +"/"+ the name of the object, e.g., "Person/Person1." If the member of a group is a reference, the path name of the object is not changed. There cannot be two members in a group with the same name.

An object can be a reference member of more than one group, but it can be an object member of only one group. An object member of a public containment group can be a reference member of other groups. If the containment group is private, the object members cannot be reference members of other groups.

If an object is deleted, corresponding reference members are deleted. The interrelationship between groups and member type is that an association group cannot contain object members and an containment group cannot contain reference members.

The visibility of a group is either public or private. The visibility of a group does not affect the visibility of constructs belonging to group members. It affects whether other objects can access the group members and add or delete members from the group.

Containment Group Example

Figure 3A:
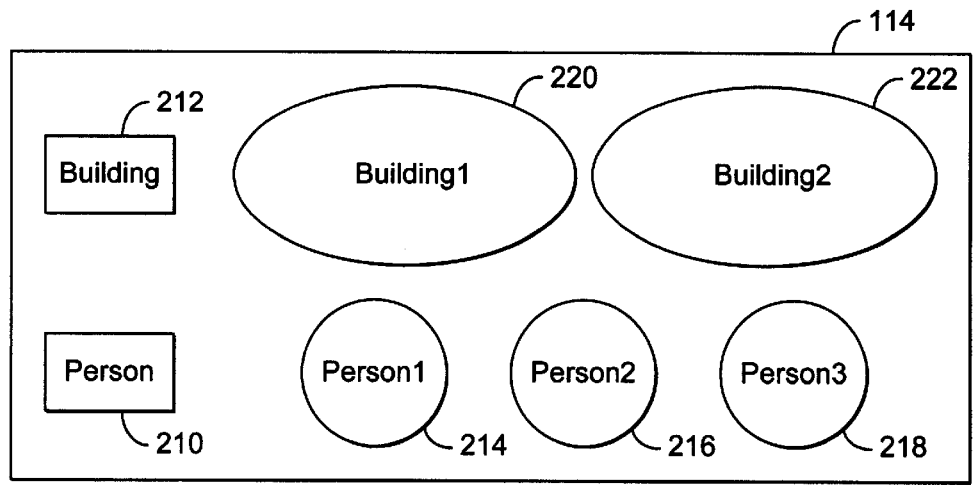
FIGS. 3A–3F illustrate the creation and display of containment groups and containment links.

FIG. 3A illustrates a containment link structure as practiced by the present invention.

An object oriented programming language user should be able to model the fact that people are inside buildings, they can move from one building to another, and people may not be in a building.

To model this system, a user would create a Person Class 210 and a Building Class 212 inside of the object oriented system 114. Person Class 210 would have several objects, e.g., Person1 214, Person2 216, and Person3 218. Building Class 212 would also have several objects, e.g., Building1 220 and Building2 222.

Some of the objects in Person Class 210 are in buildings, and some of the objects in Person Class 210 are not. Further, any given object within Person Class 210 cannot be in more than one building at any given time.

Figure 3B:
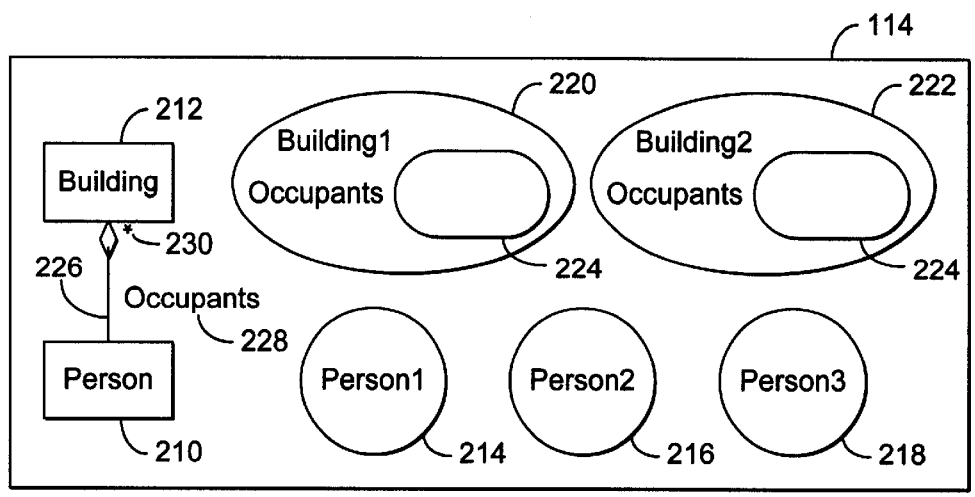

FIG. 3B shows the creation of a containment group and containment link by the present invention.

The present invention allows for a group 224, otherwise known as a containment group, to collect and synchronize all of the objects within Person Class 210 that are in Building1 220. Once group 228 is created, a link 226 is created between person class 210 and building class 212. Person1 214, person2 216, and person3 218 can move in and out of group 224 depending on whether Person1 214 and Person2 216 move from Building1 220. Changing the number of objects within Person Class 210 that are associated with an object building does not change the definition of Building Class 212. Group 224 is given a name 228, occupants, and a multiplicity value 230. To specify a containment group, multiplicity value 230 must be unlimited, denoted by an asterisk.

Figure 3C:
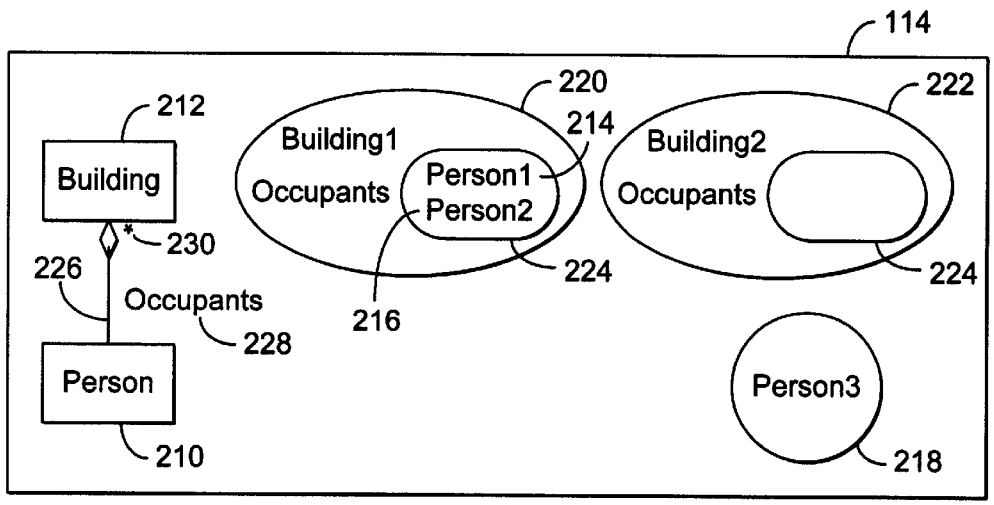

FIG. 3C illustrates changing the objects within a containment group.

Person1 214 and person2 216 can move from outside building1 220 to inside building 1 220. When person1 and person2 do this, they will be members of group 224 within the instance building1 220 of building class 212. Group 224 associated with instance building2 222 is still empty, since no member of person class 210 is in building2 222.

Figure 3D:
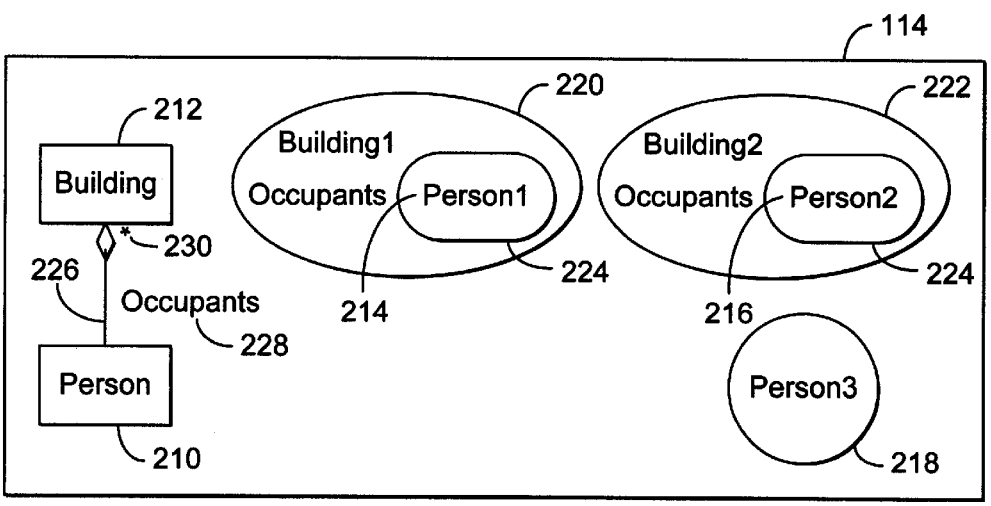

FIG. 3D illustrates moving objects between containment groups.

As person2 216 leaves building1 220 and enters building2 222, person2 214 moves from group 224 associated with instance buildings 220 to group 224 associated with instance building2 222.

Figure 3E:
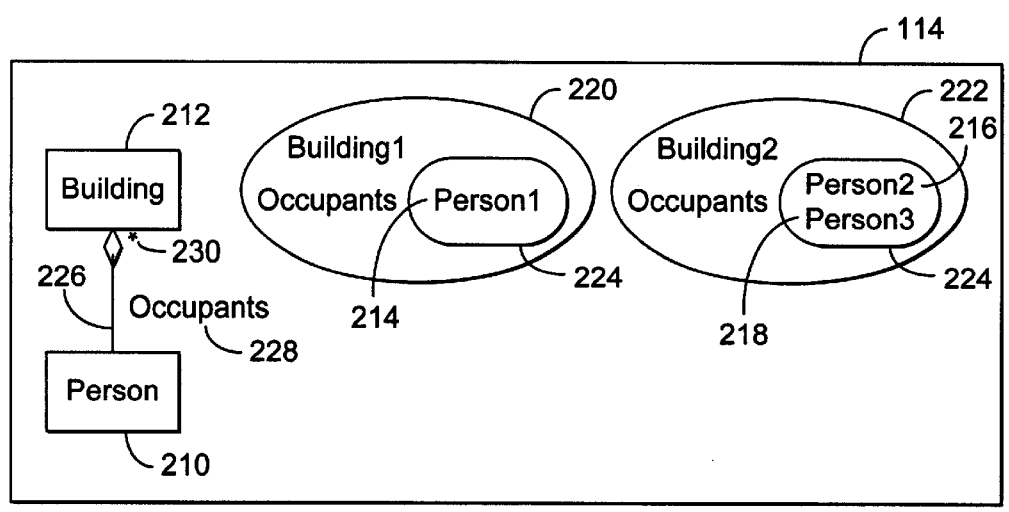

FIG. 3E illustrates moving objects between containment groups.

As person3 218 joins person2 216 in building2 222, person3 218 moves into group 224 associated with instance building2 222.

Figure 3F:
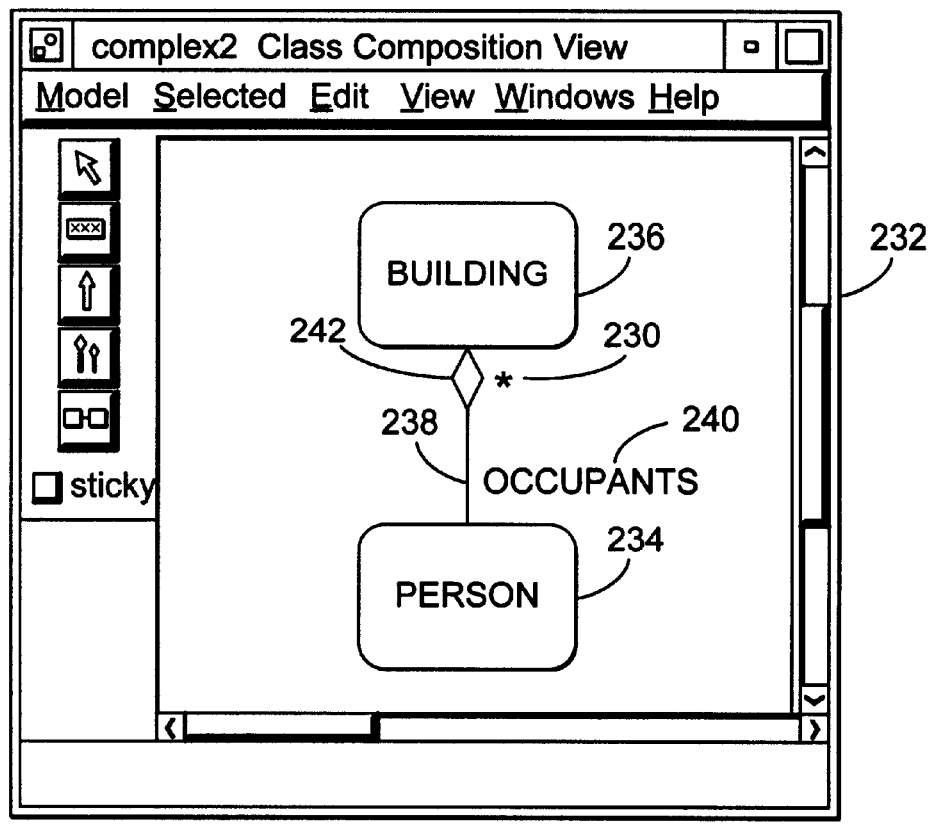

FIG. 3F illustrates a typical view of containment links and containment groups on the display of a computer.

Window 232 is a class composition view (CCV) window that is typically displayed on the monitor of the computer to show the user the containment links for a given model. Person class 210 is represented by icon 234 and building class 212 is represented by icon 236. Containment link 226 is represented by link 238, and link 238 shows that icon 234 and icon 236 are coupled together. The name 240 of containment link 226 is listed with the link 238, e.g., "occupants." Further, multiplicity value 230 is listed with the link, e.g., "*."

The diamond shaped head 242 of link 238 indicates that person class 210 is contained within building class 212.

Association Group Example

Figure 4A:
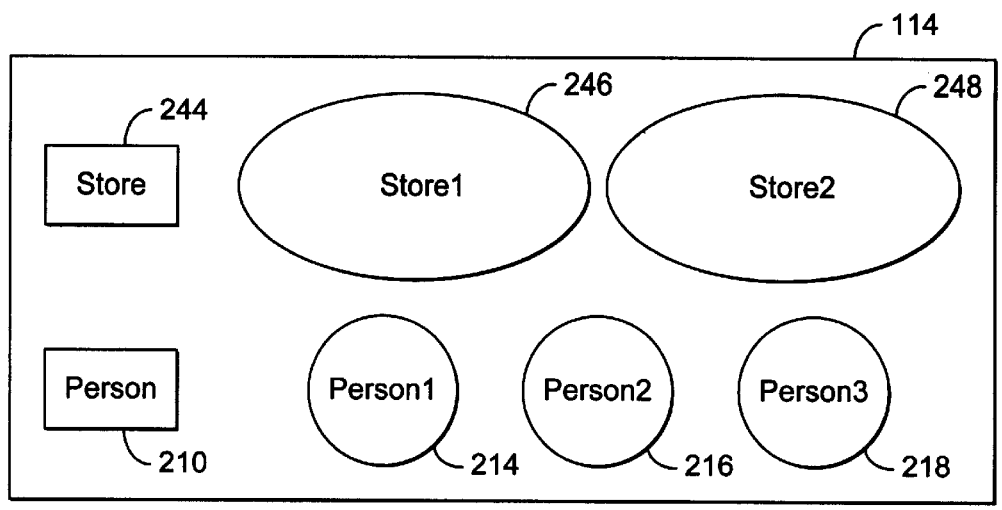
FIGS. 4A–4F illustrate the creation and display of association groups and reference links.

FIG. 4A illustrates an association link structure as practiced by the present invention.

Person Class 210 again contains objects Person1 214, Person2 216, and Person3 218. Objects in the Person Class 210 shop at stores in the Store Class 244, Store1 246 and Store2 248 being objects within Store Class 244. Each Store groups the customers by whether they shop at that store or not.

Figure 4B:
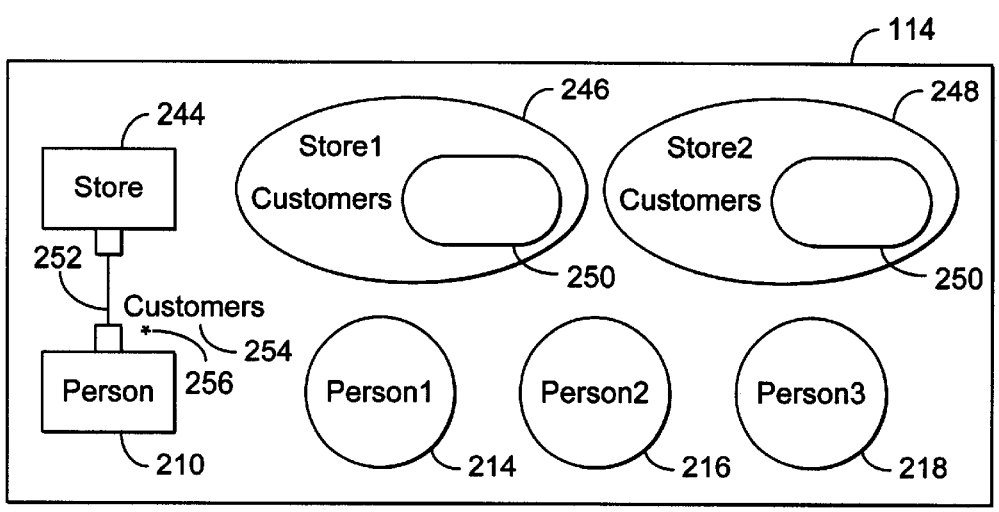

FIG. 4B shows the creation of an association link and an association group in the present invention.

FIG. 4B shows the creation of a group 250 within store class 244. To illustrate this group 250, called an association group, a link 252 is created between person class 210 and store class 244. Link 252 has an associated name 254 and an associated multiplicity value 256. To create an association link, the multiplicity value 256 must be unlimited, denoted by an asterisk. The group 250 is initially empty upon creation.

Figure 4C:
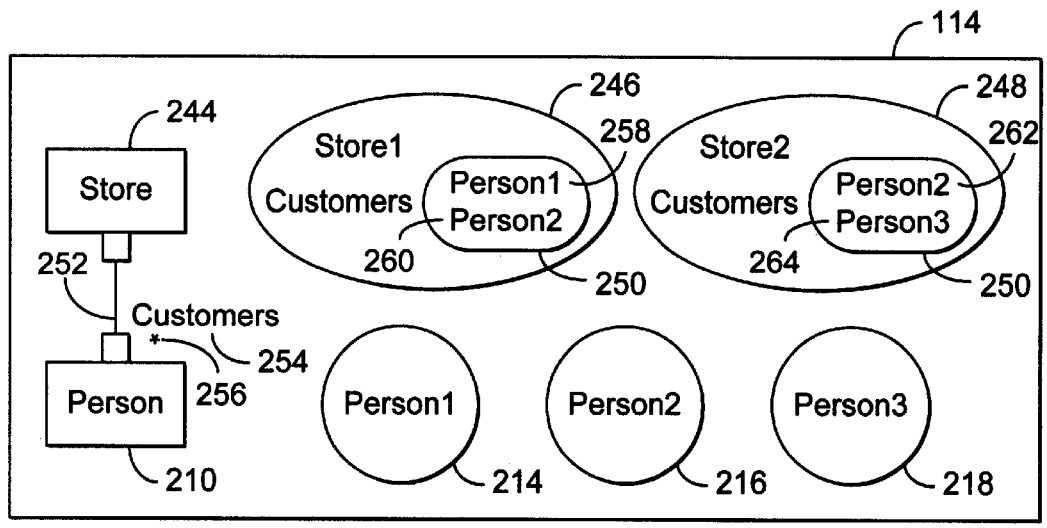

FIG. 4C shows changing the members within the association group of the present invention.

FIG. 4C shows adding reference members corresponding to the instances of the person class 210 that will be members of group 250. Reference member 258 shows that person1 214 shops at store1 246. Reference member 260 shows that person2 216 also shops at store1 246. Reference member 262 shows that person2 216 shops at store2 248, and reference member 264 shows that person3 218 shops at store2 248. Thus, the reference members 258–264 are placed in group 250 to show the relationships between person class 210 and store class 244. The objects 214–218 are not physically contained within group 250. Further, one object, e.g., person2 216, can be in both group 250 associated with store1 246 and group 250 associated with store2 248.

Figure 4D:
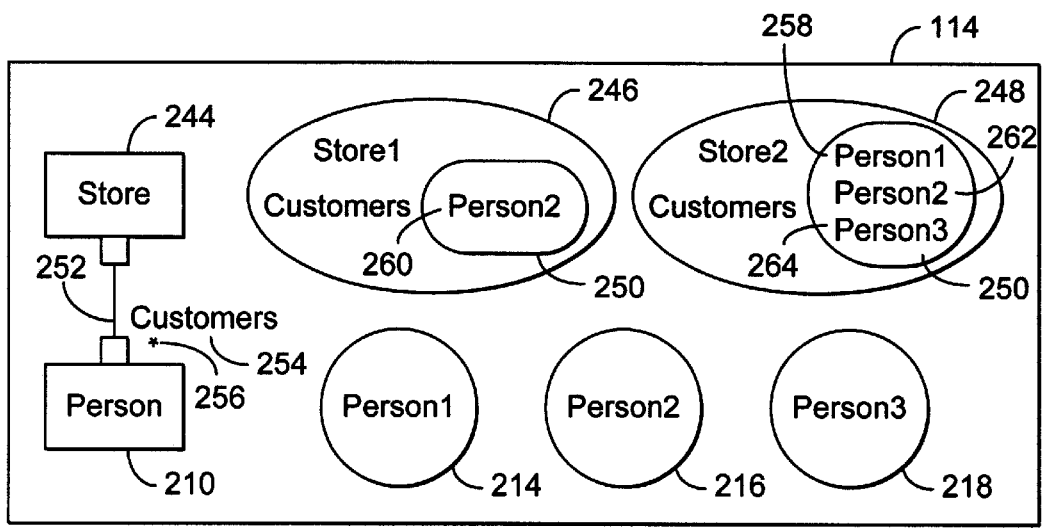

FIG. 4D shows moving a reference to an association group.

If person1 214 stops shopping at store1 246, and starts shopping at store2 248, reference member 258 is moved from group 250 associated with store1 246 to group 250 associated with store2 248 to illustrate the change in association between person class 210 and store class 244.

Figure 4E:
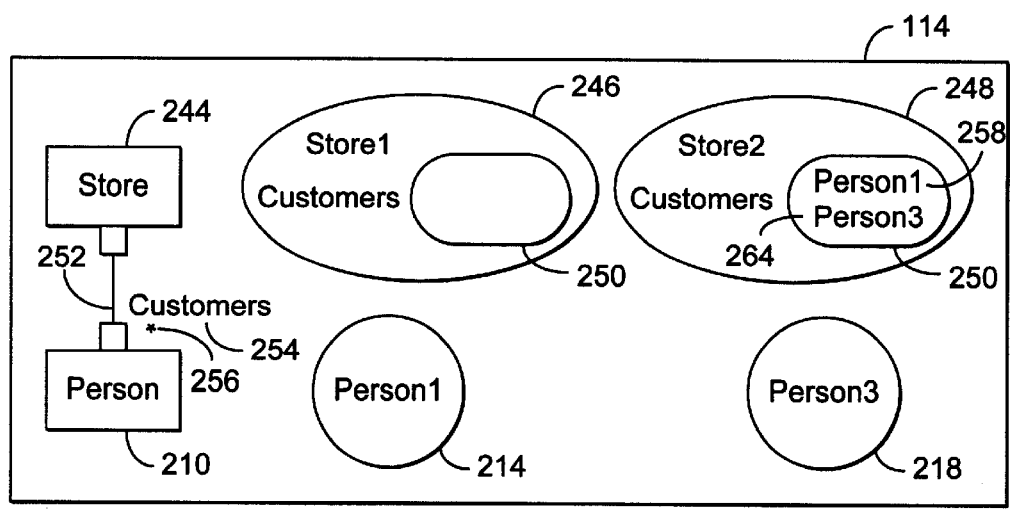

FIG. 4E shows deleting an object from a class in the present invention.

If person2 216 moves away from the area, person2 216 can no longer shop at store1 246 and store2 248. In this scenario, person2 216 will be deleted from the model in the memory 114, and the reference members that represent person2 216, e.g., reference members 260 and 262, will be correspondingly deleted from group 250 associated with store1 246 and group 250 associated with store2 248.

Figure 4F:
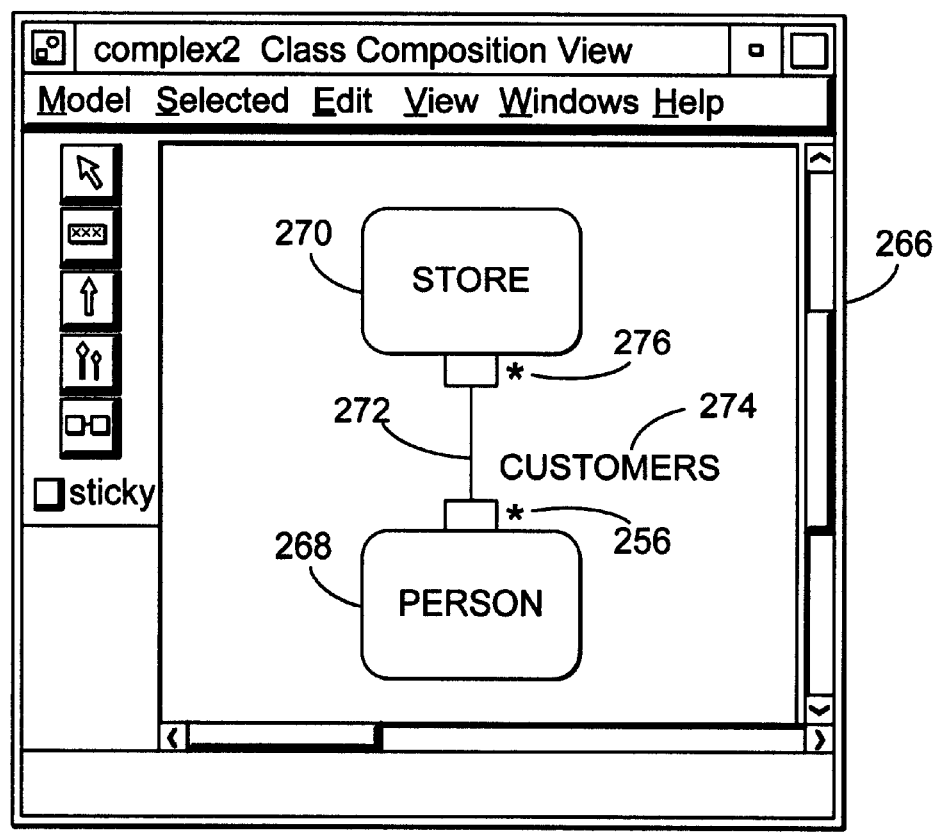

FIG. 4F illustrates a typical view of association groups and association links on the display of a computer.

Window 266 is a typical CCV window that is displayed on the monitor 118 of the computer 102. Window 266 shows person class icon 268 representing person class 210 and store class icon 270 representing store class 244 connected by association link 272. Association link 272 is shown with a link name 274, e.g., "customers." Association link 272 is also shown with multiplicity values 256 and 276, to show the multiplicity values of the roles for each end of the association link 272.

Containment Group and Containment Link Description

Figure 5:
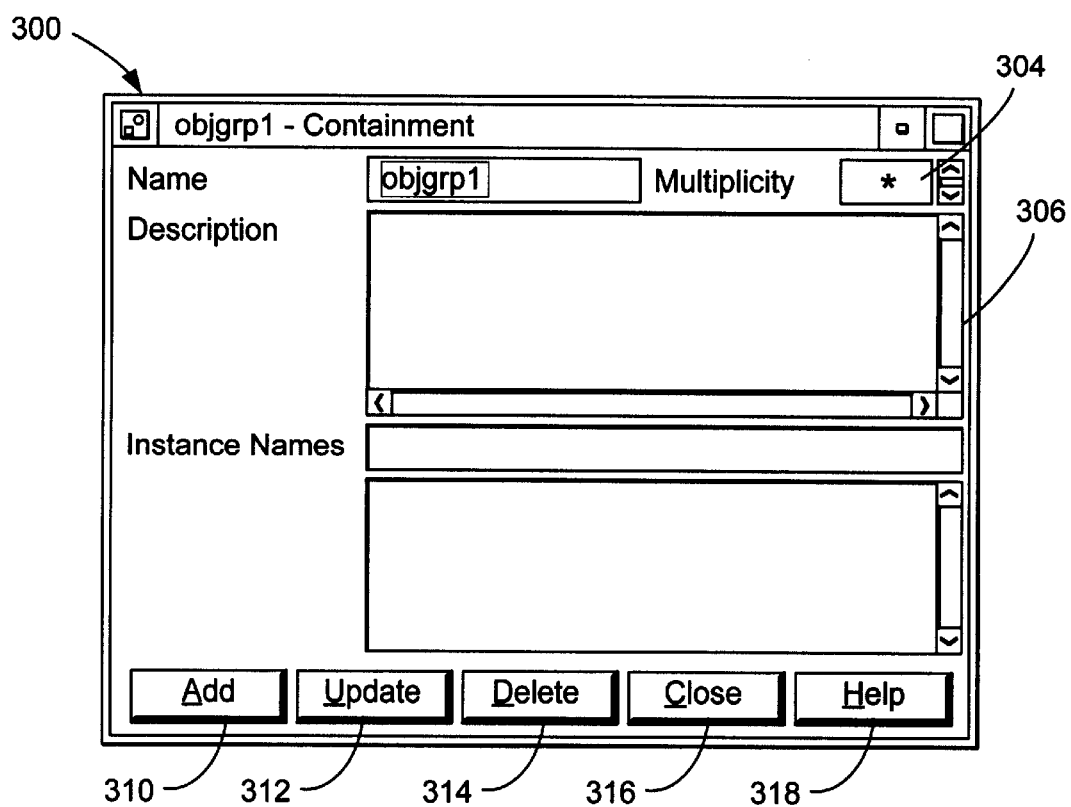
FIG. 5 illustrates a window used to specify containment links and containment groups as used in the present invention.

FIG. 5 illustrates a window used to specify containment links and containment groups as used in the present invention.

To specify a containment group of objects within an object-oriented model, the containment group of objects must be specified such that the computer that is running a given object-oriented model is able to use the information about the containment group.

As shown in FIG. 5, window 300 is displayed on the monitor of a computer to assist the programmer or user in specifying a containment group. For containment groups name 302, if the multiplicity value 304 is unlimited, denoted by an asterisk, then containment groups with the name specified in name field 302 are added to instances of the container class. A description of the containment group is described in description field 306.

The window 300 also contains pushbuttons 310–318 which allow the user to update or delete a given containment link or group, close the window 300, or request online help. Button 310 is disabled for containment groups.

Association Group and Association Link Description

Figure 6:
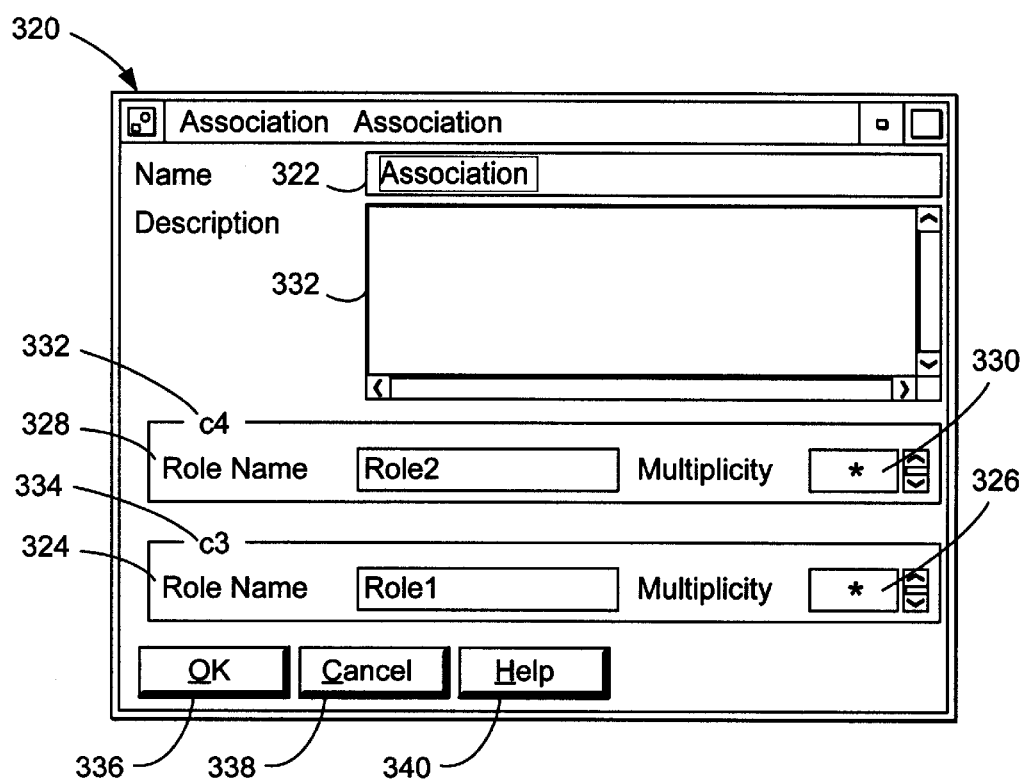
FIG. 6 illustrates a window used to create association links and association groups as used in the present invention.

FIG. 6 illustrates a window used to create association links and association groups as used in the present invention.

As shown in FIG. 6, window 320 is displayed on the monitor of a computer to assist the programmer or user in creation of the containment group. The name 322 is used to specify the association link, along with role1 324 with multiplicity value 326, and role2 328 with multiplicity value 330.

Name 322 allows the user to give a unique name to the association link or association group. Description 332 provides a description of the association link.

When multiplicity value 330 is specified as unlimited, then the value of the role name field 328 is the name of an association group. When multiplicity value 326 is specified as unlimited, then the value of the role name field 324 is the name of another association group. Class name 332 is the class in which the association group named in role name 328 exists. Class name 334 is the class in which the association group named in role name 324 exists. The names of the classes 332 and 334 cannot be changed in window 320.

Pushbuttons 336–340 are provided for the user to verify the correctness of the information in the window 320, cancel the creation of the association link or association group, or to request online help.

Figure 7:
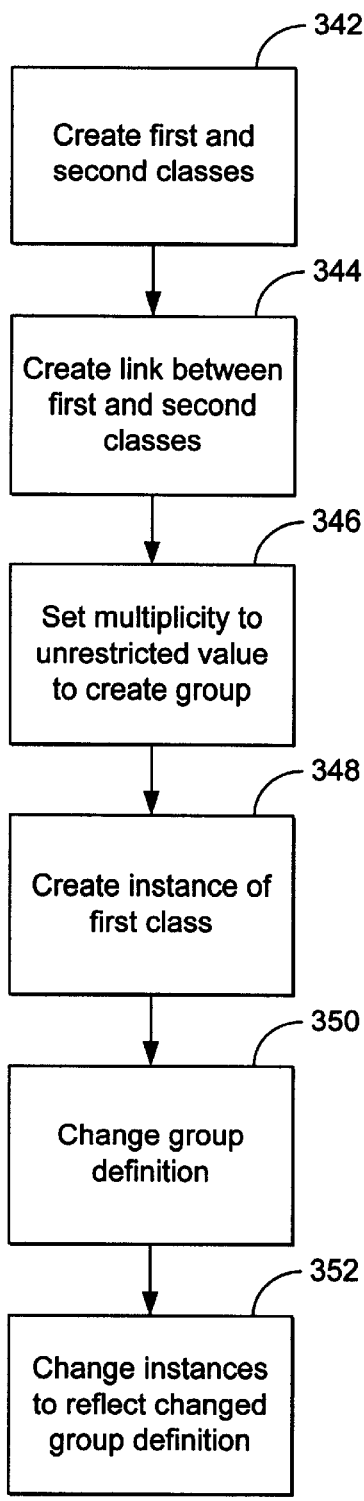
FIG. 7 is a block diagram illustrating the steps performed in the present invention.

FIG. 7 is a block diagram illustrating the steps performed in the present invention.

Block 342 illustrates the computer creating a first class and a second class in the object-oriented model.

Block 344 illustrates the computer creating a link between the first class and the second class in the object-oriented model.

Block 346 illustrates the computer setting a multiplicity to an unrestricted value to define a group for each instance of the first class and each instance of the second class.

Block 348 illustrates the computer creating an instance of the first class where the instance has at least one group.

Block 350 illustrates the computer changing the group definition.

Block 352 illustrates the computer changing the instances to reflect the changed group definition.

Conclusion

This concludes the description of the preferred embodiment of the invention. The present invention discloses a method, apparatus, and article of manufacture for synchronizing an object hierarchy in an object-oriented system. The method comprises the steps of creating a first class and a second class within a memory of a computer, creating a link between the first class and the second class within the memory of the computer, setting a multiplicity value within the memory of the computer to define a first group within the first class and a second group within the second class, creating an instance of the first class in the memory of the computer where the instance is within the first group, changing the group definition in the memory of the computer to include the instance and link the first group to the second group via the created link, and changing the created link in the memory of the computer to reflect the changes in the defined first group.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for synchronizing interrelationship links of an object-oriented system, comprising the steps of:
   (a) creating a link between first and second groups within a memory of a computer, wherein the first group is defined by a first group construct within a first class and the second group is defined by a second group construct within a second class, and wherein the link defines and supports a multiplicity variable;
   (b) creating at least one first object from the first class in the memory of the computer, wherein the first object is grouped within the first group, wherein the first object is not linked to the first group;
   (c) creating at least one second object from the second class in the memory of the computer, wherein the second object is grouped within the second group, wherein the second object is not linked to the second group; and
   (d) changing parameters of the created link in order to synchronize the system as relationships change between the first objects in the first group and the second objects in the second group.

2. The method of claim 1, wherein the link created is an association link, and the first and second groups include at least one association group.

3. The method of claim 1, wherein the link created is a containment link.

4. The method of claim 3, wherein the containment link corresponds to a containment group within the first class.

5. The method of claim 1, wherein at least one attribute of a link is independently configurable.

6. The method of claim 1, wherein the object created from the first class inherits the link relationships of the first class.

7. The method of claim 1, wherein the changes to relationships between first and second objects are limited to a group within a class associated with the created link.

8. The method of claim 1, wherein the created link is a public link, the public link being accessible by a second created instance of the first class.

9. The method of claim 1, wherein the created link is a private link, the private link being accessible only by the created instance.

10. The method of claim 1, further comprising displaying the first and second groups on windows of a computer display wherein the windows are all synchronized.

11. A computerized apparatus for synchronizing elements of an object-oriented system, comprising:

(a) a computer having a memory;

(b) means, performed by the computer, for creating a link between first and second groups within the memory of the computer, wherein the first group is defined by a first group construct within a first class and the second group is defined by a second group construct within a second class, and wherein the link defines and supports a multiplicity variable;

(c) means, performed by the computer, for creating at least one first object from the first class within the memory of the computer, wherein the first object is grouped within the first group and the first object is not linked to the first group;

(d) means, performed by the computer, for creating at least one second object from the second class within the memory of the computer, wherein the second object is grouped within the second group and the second object is not linked to the second group; and (e) means, performed by the computer, for changing parameters of the created link in order to synchronize the system as relationships change between the first objects in the first group and the second objects in the second group.

12. An article of manufacture comprising a program storage medium readable by a computer having a memory, the medium tangibly embodying one or more programs of instructions executable by the computer to perform method steps for synchronizing elements of an object-oriented system, the method comprising the steps of:

(a) creating a link between first and second groups within a memory of a computer, wherein the first group is defined by a first group construct within a first class and the second group is defined by a second group construct within a second class, and wherein the link defines and supports a multiplicity variable;

(b) creating at least one first object from the first class in the memory of the computer, wherein the first object is grouped within the first group and the first object is not linked to the first group;

(c) creating at least one second object from the second class in the memory of the computer, wherein the second object is grouped within the second group and the second object is not linked to the second group; and (d) changing parameters of the created link in order to synchronize the system as relationships change between the first objects in the first group and the second objects in the second group.

13. The method of claim 1, wherein the groups synchronize all objects within the group.

14. The method of claim 1, wherein the defining comprises setting a multiplicity value within the memory of the computer.

15. The apparatus of claim 11, wherein the groups synchronize all objects within the group.

16. The apparatus of claim 11, wherein the defining comprises setting a multiplicity value within the memory of the computer.

17. The apparatus of claim 11, wherein the link created is an association link, and the first and second groups include at least one association group.

18. The apparatus of claim 11, wherein the link created is a containment link.

19. The apparatus of claim 18, wherein the containment link corresponds to a containment group within the first class.

20. The apparatus of claim 11, wherein at least one attribute of a link is independently configurable.

21. The apparatus of claim 11, wherein the object created from the first class inherits the link relationships of the first class.

22. The apparatus of claim 11, wherein the changes to relationships between first and second objects are limited to a group within a class associated with the created link.

23. The apparatus of claim 11, wherein the created link is a public link, the public link being accessible by a second created instance of the first class.

24. The apparatus of claim 11, wherein the created link is a private link, the private link being accessible only by the created instance.

25. The apparatus of claim 11, further comprising displaying the first and second groups on windows of a computer display wherein the windows are all synchronized.

26. The article of manufacture of claim 12, wherein the groups synchronize all objects within the group.

27. The article of manufacture of claim 12, wherein the defining comprises setting a multiplicity value within the memory of the computer.

28. The article of manufacture of claim 12, wherein the link created is an association link, and the first and second groups include at least one association group.

29. The article of manufacture of claim 12, wherein the link created is a containment link.

30. The article of manufacture of claim 29, wherein the containment link corresponds to a containment group within the first class.

31. The article of manufacture of claim 12, wherein at least one attribute of a link is independently configurable.

32. The article of manufacture of claim 12, wherein the object created from the first class inherits the link relationships of the first class.

33. The article of manufacture of claim 12, wherein the changes to relationships between first and second objects are limited to a group within a class associated with the created link.

34. The article of manufacture of claim 12, wherein the created link is a public link, the public link being accessible by a second created instance of the first class.

35. The article of manufacture of claim 12, wherein the created link is a private link, the private link being accessible only by the created instance.

36. The article of manufacture of claim 12, further comprising displaying the created link and the first and second groups on windows of a computer display wherein the windows are all synchronized.

* * * * *